(12) United States Patent  (10) Patent No.: US 7,734,556 B2
Tan et al.  (45) Date of Patent: Jun. 8, 2010

(54) METHOD AND SYSTEM FOR DISCOVERING KNOWLEDGE FROM TEXT DOCUMENTS USING ASSOCIATING BETWEEN CONCEPTS AND SUB-CONCEPTS

(75) Inventors: Ah Hwee Tan, Singapore (SG); Rajaraman Kanagasabai, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 548 days.

(21) Appl. No.: 10/532,163

(22) PCT Filed: Oct. 24, 2002

(86) PCT No.: PCT/SG02/00249

§ 371 (c)(1),
(2), (4) Date: Oct. 4, 2005

(87) PCT Pub. No.: WO2004/042493

PCT Pub. Date: May 21, 2004

(65) Prior Publication Data

US 2006/0026203 A1  Feb. 2, 2006

(51) Int. Cl.
*G06F 17/00* (2006.01)
*G06N 5/00* (2006.01)

(52) U.S. Cl. ............... 706/45; 706/16; 706/20

(58) Field of Classification Search ............ 706/45, 706/16, 20; 382/187, 182
See application file for complete search history.

(56) References Cited

U.S. PATENT DOCUMENTS 5,297,039 A * 3/1994 Kanaegami et al. ............ 707/5
5,881,187 A    3/1999 Modavis
5,905,505 A    5/1999 Lesk (Continued)

FOREIGN PATENT DOCUMENTS

JP    2002-99565 A    5/2002

(Continued)

OTHER PUBLICATIONS

He et al., Ji, "Machine Learning Methods for Chinses Web Page Categorization", Proceeding of the Second Workshop on Chinese Language Processing, pp. 93-100, 2000.*

(Continued)

*Primary Examiner*—David R Vincent
*Assistant Examiner*—Adrian L Kennedy
(74) *Attorney, Agent, or Firm*—Conley Rose, P.C.

(57) ABSTRACT

A method and a system for discovering knowledge from text documents are disclosed, which involve extracting from text documents semi-structured meta-data, wherein the semi-structured meta-data includes a plurality of entities and a plurality of relations between the entities; identifying from the semi-structured meta-data a plurality of key entities and a corresponding plurality of key relations; deriving from a domain knowledge base a plurality of attributes relating to each of the plurality of entities relating to one of the plurality of key entities for forming a plurality of pairs of key entity and a plurality of attributes related thereto; formulating a plurality of patterns, each of the plurality of patterns relating to one of the plurality of pairs of key entity and a plurality of attributes related thereto; analyzing the plurality of patterns using an associative discoverer; and interpreting the output of the associative discoverer for discovering knowledge.

39 Claims, 10 Drawing Sheets

U.S. PATENT DOCUMENTS

| | | | |
|---|---|---|---|
| 6,044,375 | A | 3/2000 | Shmueli et al. |
| 6,208,735 | B1 | 3/2001 | Cox et al. |
| 6,209,103 | B1 | 3/2001 | Schreiber et al. |

FOREIGN PATENT DOCUMENTS

| | | |
|---|---|---|
| WO | WO 99-34307 A1 | 7/1999 |

OTHER PUBLICATIONS

Tan et al., Ah-Hwee, "Learning User Profiles for Personalized Information Dissemination", IEEE, pp. 183-188, May 1998.*

Ah-Hwee Tan, "Predictive Self-Organing Networks for Text Categorization", PAKDD, pp. 66-77, Apr. 18, 2001.*

Rajaraman et al., Kanagasabi, "Topic Detection, Tracking, and Trend Analysis Using Self-Organizing Neural Networks", PAKDD, pp. 102-107, Apr. 18, 2001.*

Ah-Hwee Tan, "Predictive Self-Organizing Networks for Text Categorization", PAKDD, pp. 66-77, Apr. 18, 2001.*

Agency for Science, Technology and Research, International Search Report mailed Dec. 28, 2005 for International Application No. PCT/SG 2002/000249 (3 p.).

* cited by examiner

Category choice: $T_j = \gamma \frac{|A \wedge W_j^a|}{\alpha^a + |W_j^a|} + (1-\gamma) \frac{|B \wedge W_j^b|}{\alpha^b + |W_j^b|}$

FIG. 5

Template learning $$w_j^{a(new)} = (1-\beta^a)w_j^{a(old)} + \beta^a(A \wedge w_j^{a(old)})$$

$$w_j^{b(new)} = (1-\beta^b)w_j^{b(old)} + \beta^b(B \wedge w_j^{b(old)})$$

METHOD AND SYSTEM FOR DISCOVERING KNOWLEDGE FROM TEXT DOCUMENTS USING ASSOCIATING BETWEEN CONCEPTS AND SUB-CONCEPTS

FIELD OF INVENTION

The invention relates generally to the field of natural language processing, text mining, and knowledge discovery. In particular, it relates to a method and a system for extracting and discovering knowledge from text documents.

BACKGROUND

Due to the recent advancement of information technology and the growing popularity of the Internet, a vast amount of information is now available in digital form in both the Internet and the Intranet environments. Such availability of information has provided many opportunities. In the commercial world for example, online information is an advantageous source of business intelligence that is crucial to a company's survival and adaptability in a highly competitive environment. Unfortunately, a user in this situation is usually faced with too much information and too little knowledge that is useful or actionable knowledge. The processes of extracting and discovering knowledge, or knowledge extraction and discovery, from text documents or the like textual data are thus very important tasks of considerable application potential and impact.

Conventional methods and systems of knowledge extraction and discovery from text documents typically focus on the extraction of information or meta-data from free-text documents. Meta-data, which are condensed and typically semi-structured representations of text content, can be considered as the raw form of knowledge and are essentially facts specified in the text documents. Meta-data do not include knowledge that is not mentioned explicitly in the text. In addition, there is usually too much information extracted by the conventional methods and systems and it is a painstaking process for a user to organize and discover wisdom from the extracted information.

Specifically, in U.S. Pat. No. 6,076,088 and U.S. Pat. No. 6,263,335, both entitled "Information Extraction System and Method using Concept-Relation-Concept (CRC) Triples" by Paik et al, systems are proposed for building subject knowledge bases in the form of Concept-Relation-Concept (CRC) triples from text documents. The systems can acquire new knowledge by automatically identifying new names, events, or concepts from text documents.

In International Patent Publication No. WO 01/01289 entitled "Semantic Processor and Method with Knowledge Analysis of And Extraction from Natural Language Documents" by Tsourikov et al, the use of natural language processing methods are proposed for the extraction of Subject-Action-Object (SAO) tuples from text documents upon a user request. The methods further include normalization and organization of SAO triplets into Problem Folders with Action-Object (AO) portions as the name of the folders containing a list of subjects. In International Patent Publication No. WO 01/82122 entitled "Expanded Search and Display of SAO Knowledge Based Information" by Tsourikov et al, the methods proposed by Tsourikov et al in WO 01/01289 are extended by proposing methods for normalizing SAO triplets through paraphrasing AOs.

A critical problem associated with the foregoing proposals lies in the common and attendant inability of the proposed systems and methods to derive new or hidden knowledge from text documents that is often the critical differentiating factor in gaining an edge over competitors.

There is therefore a need for a method and a system for knowledge extraction and discovery from text documents for addressing such a problem.

SUMMARY

In accordance with a first aspect of the invention, there is provided a method for discovering knowledge from text documents, the method comprising the steps of:
  extracting from text documents semi-structured meta-data, wherein the semi-structured meta-data includes a plurality of entities and a plurality of relations between the entities;
  identifying from the semi-structured meta-data a plurality of key entities and a corresponding plurality of key relations;
  deriving from a domain knowledge base a plurality of attributes relating to each of the plurality of entities relating to one of the plurality of key entities for forming a plurality of pairs of key entity and a plurality of attributes related thereto;
  formulating a plurality of patterns, each of the plurality of patterns relating to one of the plurality of pairs of key entity and a plurality of attributes related thereto;
  analyzing the plurality of patterns using an associative discoverer; and
  interpreting the output of the associative discoverer for discovering knowledge.

In accordance with a second aspect of the invention, there is provided a computer program product comprising a computer usable medium having computer readable program code means embodied in the medium for discovering knowledge from text documents, the computer program product comprising:
  computer readable program code means for extracting from text documents semi-structured meta-data, wherein the semi-structured meta-data includes a plurality of entities and a plurality of relations between the entities;
  computer readable program code means for identifying from the semi-structured meta-data a plurality of key entities and a corresponding plurality of key relations;
  computer readable program code means for deriving from a domain knowledge base a plurality of attributes relating to each of the plurality of entities relating to one of the plurality of key entities for forming a plurality of pairs of key entity and a plurality of attributes related thereto;
  computer readable program code means for formulating a plurality of patterns, each of the plurality of patterns relating to one of the plurality of pairs of key entity and a plurality of attributes related thereto;
  computer readable program code means for analyzing the plurality of patterns using an associative discoverer; and
  computer readable program code means for interpreting the output of the associative discoverer for discovering knowledge.

In accordance with a third aspect of the invention, there is provided a system for knowledge discovery from free-text documents, comprising:
  means for extracting semi-structured meta-data from the free-text documents;
  means for identifying key entities and key relations from the semi-structured meta-data;
  a knowledge base that defines the attributes of entities;

means for formulating patterns based on the key entities and the attributes of entities related to the key entities; and means for analyzing the patterns for knowledge.

BRIEF DESCRIPTION OF THE DRAWINGS

Embodiments of the invention are described hereinafter by way of example with reference to the accompanying drawings, in which.

DETAILED DESCRIPTION

The foregoing problem is addressed by a method and a system described hereinafter for transforming meta-data or the like information extracted from text documents in a domain and thereby discovering knowledge that is new or previously undiscovered in the extracted information and the text documents.

A method and a system for knowledge discovery according to embodiments of the invention described hereinafter relate to the discovery of new or hidden knowledge from free-text documents in a domain. According to the embodiments, semi-structured meta-data are first extracted from unstructured free-text documents. The semi-structured meta-data typically comprise entities as well as the relationships between the entities known as relations. The embodiments involve the use of a domain knowledge base dependent on taxonomy, a concept hierarchy network, ontology, a database, or a thesaurus, from which attributes or the like features of the entities can be obtained. The knowledge discovery method or system then uncovers the hidden knowledge in the relevant domain by analyzing the relationships between the attributes and the entities, mapping from an attribute space to an entity space. A domain refers to an application context in which the embodiments operate or function. Relevant fields of application include knowledge management, business intelligence, scientific discovery, bio-informatics, semantic web, and intelligent agents.

Figure 1:
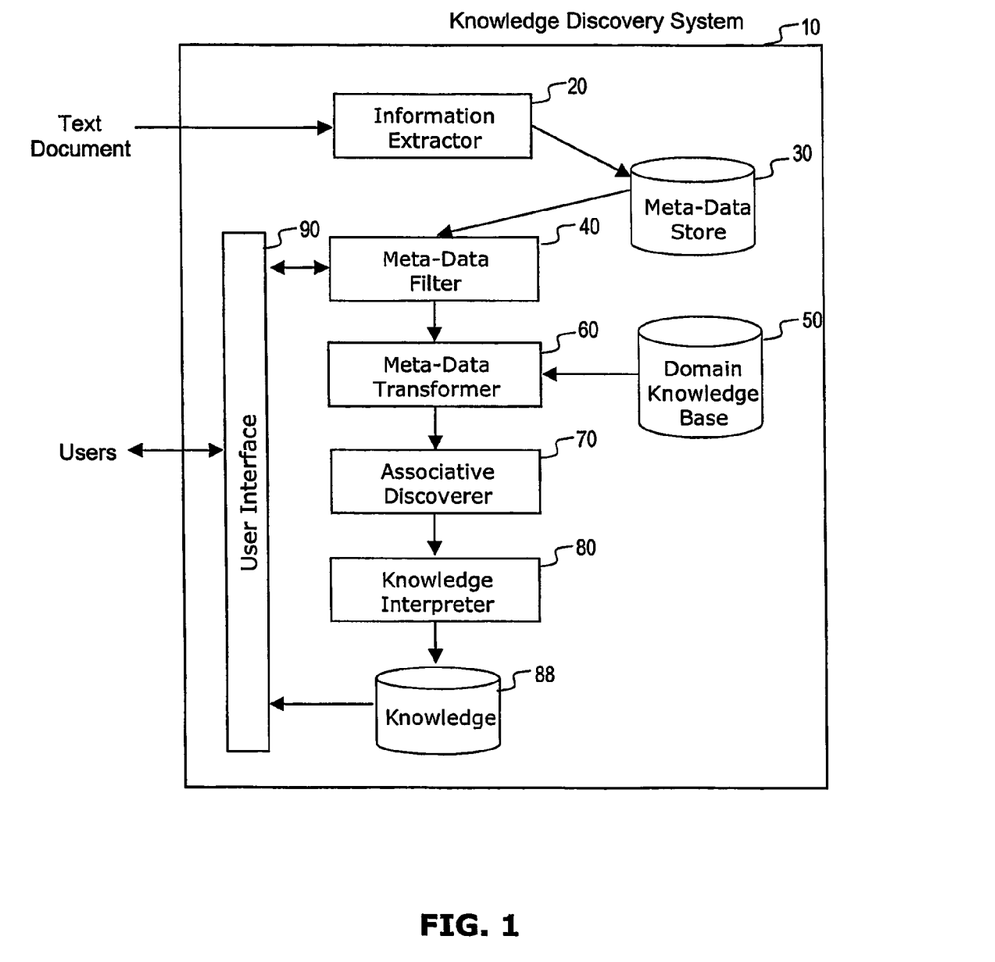
FIG. 1 illustrates a knowledge discovery system according to an embodiment of the invention.

With reference to FIG. 1, using a knowledge discovery method a knowledge discovery system 10 in accordance with an embodiment of the invention is described, comprising a meta-data extractor 20, an intermediate meta-data store 30, a meta-data filter 40, a domain knowledge base 50, a meta-data transformer 60, an associative discoverer 70, a knowledge interpreter 80, and a user interface 90.

The meta-data extractor 20 allows a user of the knowledge discovery system 10 to extract semi-structured meta-data from free-text documents, which can be stored in the meta-data store 30 on a permanent or temporary basis. The semi-structured meta-data can be in the Noun-Verb-Noun form as commonly referred to in the field of Natural Language Processing, or in the form of Concept-Relation-Concept (CRC) triples as proposed in U.S. Pat. No. 6,263,335, or in the form of Subject-Action-Object (SAO) tuples as proposed in International Patent Publication No. WO 01/01289, or in other known forms. A noun, a concept, a subject, or an object, is an entity or the like individual element in a domain. For example, an entity can be a company, a product, a person, a protein, and etc.

For purposes of brevity of description hereinafter, an entity is exemplified by a concept of which an attribute is a sub-concept. However, the embodiments of the invention are not restricted to application to concepts and sub-concepts but include application to other types of entities and attributes of the entities.

To identify knowledge of interest, the meta-data filter 40 identifies key concepts and relations based on the occurrence frequencies of the key concepts and users' preferences. The meta-data transformer 60 then converts a concept to a plurality of sub-concepts based on the domain knowledge base 50. For example in the case of companies, for which the concept is a company profile, the sub-concepts may be related to the company profile, such as CEO profile, countries of operations, business sectors, financial ratios and etc. The domain knowledge base 50 may be dependent on a conventional relational or object-oriented database, taxonomy, a thesaurus such as WORDNET, and/or a conceptual model such as one described in "Concept Hierarchy Memory Model", published in "International Journal of Neural Systems", Vol. 8 No. 3, pp. 437-446 (1996). The features or attributes of the concepts or sub-concepts as specified in the domain knowledge base 50 can be predefined manually or generated automatically through other term extraction or thesaurus building algorithms known in the art.

The associative discoverer 70 may embody a statistical method, a symbolic machine-learning algorithm, or a neural network model, capable of supervised and/or unsupervised learning. The neural network may comprise, for example, an Adaptive Resonance Theory Map (ARTMAP) system, such as one described in "Fuzzy ARTMAP: A Neural Network Architecture for Incremental Supervised Learning of Analog Multidimensional Maps, published in "IEEE Transactions on Neural Networks", Vol. 3, No. 5, pp. 698-713 (1992), or an Adaptive Resonance Associative Map (ARAM) system, such as one described in "Adaptive Resonance Associative Map", published in "Neural Networks", Vol. 8, No. 3, pp. 437446 (1995).

The user interface 90 may comprise a graphical user interface, keyboard, keypad, mouse, voice command recognition system, or any combination thereof, and may permit graphical visualization of information groupings.

The knowledge discovery method can be executed using a computer system, such as a personal computer or the like processing means known in the art. The knowledge discovery system 10 can be a stand-alone system, or can be incorporated into a computer system, in which case the user interface 90 can be the graphical or other user interface of the computer system and the domain knowledge base 50 may be in any conventional recordable storage format, for example a file in a storage device, such as magnetic or optical storage media, or in a storage area of a computer system.

An exemplary implementation of an embodiment of the invention is a business intelligence system in which concepts may refer to companies, products, and people, relations may refer to launch events, key hires and etc, and sub-concepts may refer to company profile, product features, and personal profile stored in an enterprise database or taxonomy. The knowledge discovery system 10 in this context may serve to uncover hidden relations among company profiles and, as an example, stock price performance, or hidden relations among personal profile and company.

Yet another exemplary application of an embodiment of the invention is a scientific discovery system in which concepts may refer to genes, plants, or diseases, relations may refer to protein interaction, localization, or disorder association, and sub-concepts may refer to DNA sequences, plant attributes and etc. The knowledge discovery system 10 in this context can be used to uncover hidden relations between, as an example, DNA sequences and a specific disease, in term of identifying key DNA segments that have a strong link to the disease.

Figure 2A:
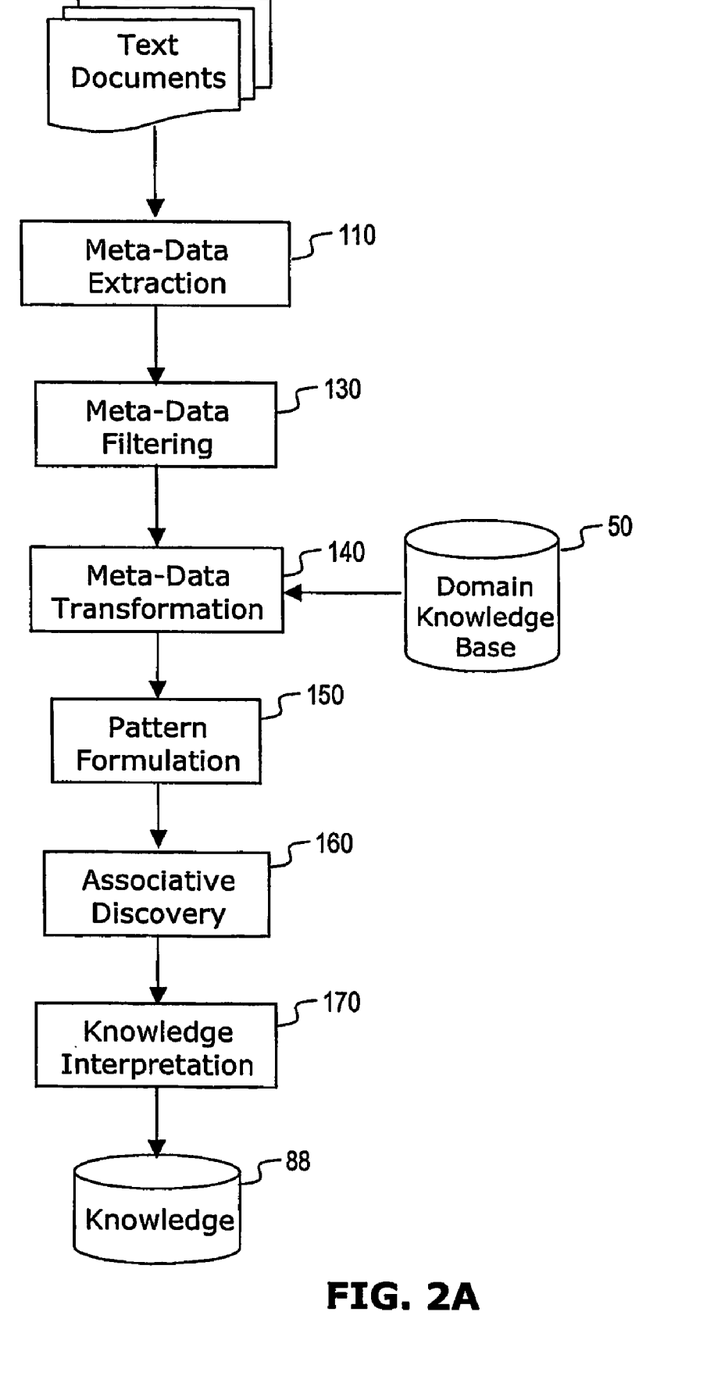
FIG. 2A illustrates a flow diagram of a knowledge discovery method according to a further embodiment of the invention.

With reference to FIG. 2A, an instance of the knowledge discovery method in accordance with a further embodiment of the invention is described. In the knowledge discovery method, a meta-data extraction step 110 first scans text documents to extract meta-data, for example, in the form of concept-relation-concept 3-tuples. A meta-data filtering step 130 next removes irrelevant 3-tuples by focusing on the prominent or key concepts and relations that the user deems as important. Next, a meta-data transformation step 140 reads an external domain knowledge base 50 dependent on taxonomy, ontology, a database, or a concept hierarchy network and derives the sub-concepts for the concepts related to a key concept. A pattern formulation step 150 then forms training samples, each consisting of a vector representing sub-concept and a vector representing a key concept. An associative discovery step 160 subsequently processes vector pairs and learns the underlying associations in the form of ARAM clusters. A knowledge interpretation step 170 further extracts knowledge in the form of IF-THEN rules from ARAM.

Figure 2B:
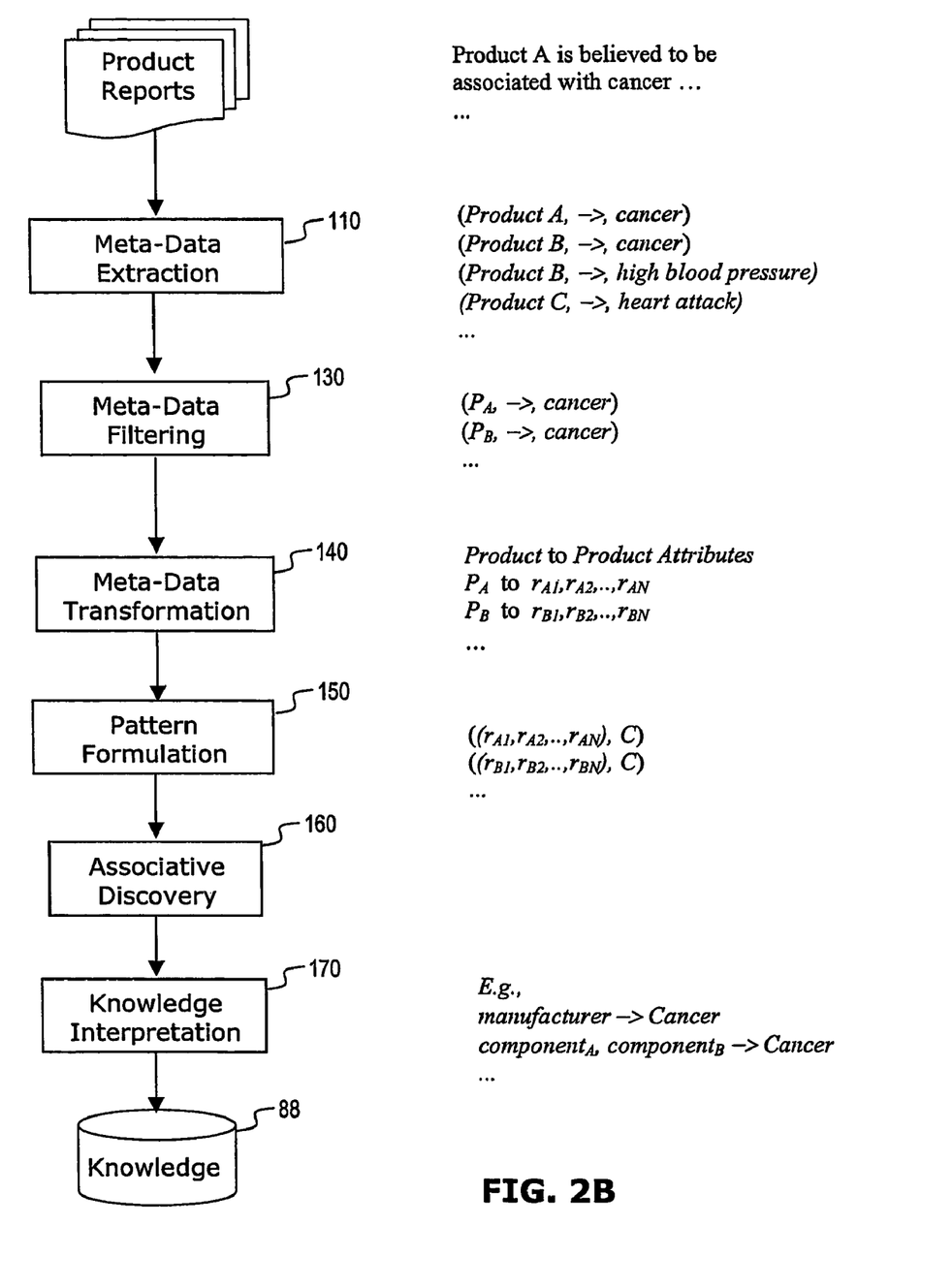
FIG. 2B illustrates an exemplary application of the knowledge discovery method of FIG. 2A for discovering relationships between product attributes and diseases.

With reference to FIG. 2B, an application of the knowledge discovery method for discovering the hidden relationships between product attributes and diseases, such as cancer, is described for illustrative purposes. The meta-data extraction step 110 scans consumer product reports to extract meta-data consisting of associations between product attributes and diseases. The meta-data filtering step 130 removes irrelevant 3-tuples by focusing on the causal relation between consumer products and cancer. The meta-data transformation step 140 reads external product knowledge dependent on taxonomy, ontology, or a database, and derives the product attributes for each product. The pattern formulation step 150 forms training samples consisting of a vector representing product attributes and another vector representing cancer. The associative discovery step 160 processes vector pairs and learns the underlying associations in the form of ARAM clusters. The knowledge interpretation step 170 extracts knowledge in the form of IF-THEN rules from ARAM. For this application, examples of the rules discovered may be the association of specific manufacturers with hazardous (cancer causing) products, and the identification of product ingredients, or combinations thereof, which consistently led to cancer.

The knowledge discovery method is described in greater detail hereinafter by way of exemplary methods or models for implementing each processing step.

Meta-Data Extraction

Figure 3:
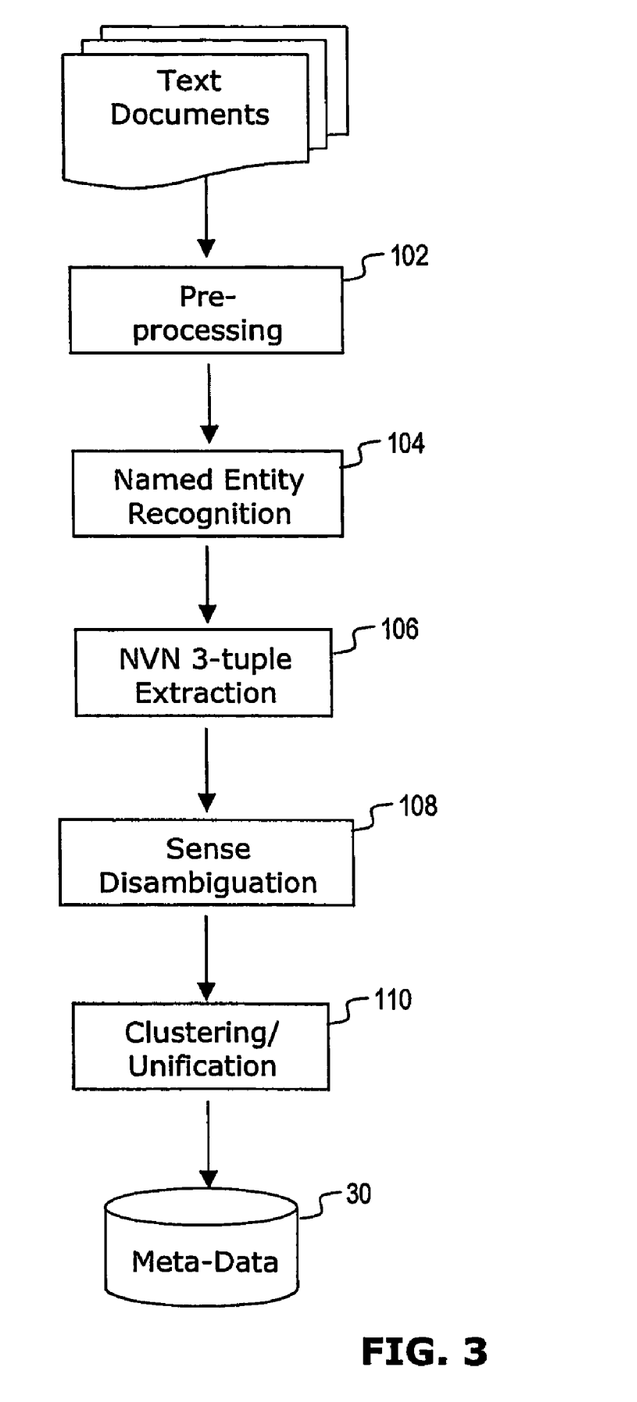
FIG. 3 illustrates an exemplary flow diagram of a meta-data extraction process of FIG. 2A.

With reference to FIG. 3, which illustrates an exemplary flow diagram of a meta-data extraction process, the meta-data extractor 20 assumes that the input documents are in plain text format. If the input documents are in a different format, the required conversion is first performed in a pre-processing step 102. For example, menu bars or formatting specifications such as HTML tags as found on web pages are removed to keep only the main body of the content. Text in image formats is converted to plain text using an optical character recognition system. Speech audio signals are converted to text using a speech recognition system. Captions and transcriptions in video are converted to text using a character recognition system and a speech recognition system respectively.

Name Entity (NE) Recognition

A name entity recognition step 104 next extracts all entities such as person names, company names, dates and numerical data (e.g. 10,000) from the preprocessed texts and creates an index. The index stores the frequency of each entity together with the identities of the source documents. NE recognition also identifies different variations of the same entity, e.g. "George Bush", "Bush, George" and "Mr. Bush", through a co-reference resolution algorithm. All variations of an entity are reduced into a standard form and annotate the documents using this standard form for further processing.

NVN 3-Tuples Extraction

An NVN 3-tuples extraction step 106 then parses sentences and derives syntactic 3-tuples in the form of (NC, VC, NC), where NC is a Noun Clause and VC is a Verb Clause. NC and VC are extended forms of Noun Phrase and Verb Phrase respectively, defined by the regular expressions

NC:–(ADJP)?(NP)⁺((IN|VBG)*(ADJP|NP))*

VC:–(ADVP)?(VP)⁺(IN|ADVP)*(VP)* where ADJP is an adjective, NP is a noun phrase, IN is a preposition, VBG is a Verb gerund, ADVP is an adverb, and VP is a verb phrase.

NVN 3-tuples offer a low-level representation for capturing the agent/verb/object relationships in text. As a first step in the extraction, text is tagged using a Part-of-Speech (POS) tagger. Then a rule-based algorithm is employed to extract the NVN 3-tuples. As an example, consider the sentence: "Bill Gates released Windows XP, an operating system for PC's". The rule

{[NC1][VC1][NC2], [DT][NC3]}→(NC1,VC1,NC2), (NC2,IS-A,NC3)

when invoked on sentence would result in the NVN 3 tuples:
 (Bill Gates, released, Windows XP), and
 (Windows XP, IS-A, operating system for PC's).

The set of the parsing rules can be constructed and validated based on a collection of documents. The rules aim to take care of a large proportion of the major sentence forms. In situation when no rule is found to match with the sentence, a special rule is made use to extract only the (NC,VC,NC)

3-tuple that appears at the beginning of the sentence. In the above example, this corresponds to (Bill Gates, released, Windows XP). Though this is approximate, often it could extract the main action conveyed by the sentence.

Sense Disambiguation

Next, a sense disambiguation step 108 identifies the specific meanings of noun clauses (NC) and verb clauses (VC) through the use of WordNet. For every word, WordNet distinguishes between its different word senses by providing separate synsets and associating a sense with each synset. The context of the words in a NC/VC is then used to compute a distance measure and pick the correct word sense for the NC/VC.

Clustering and Unification

In a clustering and unification step 110, the disambiguated NCs are grouped through a clustering algorithm, as is known in the state of the art, based on their similarities. By this, the knowledge recovery method would also take care of most of the entities that have not been reduced to the standard form during NE Recognition due to inaccuracies in NE co-reference resolution.

In addition, the verb clauses are unified according to the respective meanings. For example, "causes", "leads to", and "results in" are all different forms of expressing a causal relation. Clustering of noun clauses and unification of verb clauses complete the meta-data extraction step 110 by transforming the syntactic based NVN 3-tuples to semantic based Concept-Relation-Concept (CRC) 3-tuples type of meta-data representation.

Meta-Data Filtering

As the meta-data extraction step 110 in FIG. 2A may produce too many CRC 3-tuples, the meta-data filtering step 130 allows a user to focus on subsets of the 3-tuples by identifying key concepts and relations for the purpose of knowledge discovery. Key concepts and relations can be provided directly by the user. For example, the user can identify "cancer" as a key concept if he/she is interested in discovering factors related to cancer. Alternatively, key concepts/relations can be identified automatically through simple statistical methods, as are known in the state-of-the-art. For example, a concept/relation can be referred to as a key concept/relation if it is contained in more than half of the CRC 3-tuples extracted. This approach enables a user to discover important concepts/relations previously unknown to the user.

Meta-Data Transformation

Given a set of CRC 3-tuples, $(A_1,R,B)$, $(A_2,R,B)$, ..., and $(A_n,R,B)$, produced by the meta-data extractor 20, where B is a key concept and R is a key relation identified by the meta-data filter 40, and $A_1, A_2, \ldots, A_n$ denotes the concepts that are related to B under relation R, the meta-data transformation step 140 first obtains the sub-concept representation of $A_1$, $A_2, \ldots, A_n$ from the domain knowledge base 50. The domain knowledge base 50, whose main purpose is to provide a sub-level representation for the key concepts identified, may be dependent on a conventional relational or object-oriented database, taxonomy, a thesaurus (such as WORDNET), and/or a conceptual model. Without loss of generality, each concept $(A_1)$ can be represented by a M-dimensional vector of attributes or features, $$A_i = (a_{i1}, \ldots, a_{iM}) \quad (1)$$

where $a_{ij}$ is a real-valued number between zero and one, indicating the degree of presence of attribute j in concept $A_i$. Note that in the above representation, the relations are posi-tion specific. In other words, (A,R,B) does not necessarily imply (B,R,A). For each concept $A_i$, the pattern formulation step 150 formulates an example consisting of the sub-representation of $A_i$ and the associated concept B in the form of $(\{a_{i1}, a_{i2}, \ldots, a_{iM}\}/B)$ for processing in the associative discovery step 160 described below.

Associative Discovery

Figure 4:
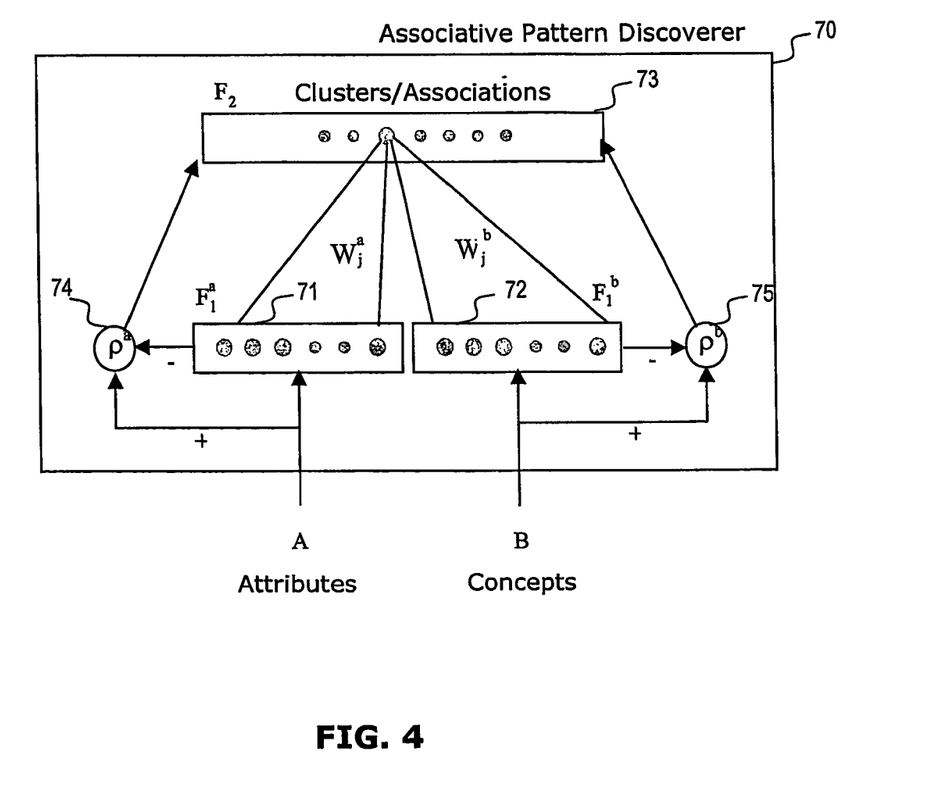
FIG. 4 illustrates an exemplary architecture for an associative discoverer of FIG. 1 for the learning of the association between sub-concepts in the sub-concept space and concepts in the concept space, in which an $F_1^a$ field serves as the input field for the sub-concepts, an $F_1^b$ field serves as the input field for the sub-concepts, and clusters are formed in an $F_2$ field that represent the associative mappings from the sub-concept space to the concept space.

With reference to FIG. 4, there is provided one such neural network-based associative discoverer 70 as described in "Adaptive Resonance Associative Map", published in "Neural Networks", Vol. 8 No. 3, pp. 437446 (1995), which is an example of the associative discoverer 70. As described in the article cited above, ARAM is a family of neural network models that performs incremental supervised learning of clusters (pattern classes) and multidimensional maps of both binary and analog patterns. An ARAM system can be visualized as two overlapping Adaptive Resonance Theory (ART) modules consisting of two input fields $F_1^a$ 71 and $F_1^b$ 72 with a cluster field $F_2$ 73. For the knowledge discovery method described herein, the input field $F_1^a$ 71 serves to represent the attribute vector A and the input field $F_1^b$ 72 serves to represent the concept vector B. Each $F_2$ cluster node j is associated with an adaptive template vector $w_j^a$ and a corresponding adaptive template vector $w_j^b$ for learning the mapping from attributes to concepts. Initially, all cluster nodes are uncommitted and all weights are set equal to 1. After a cluster node is selected for encoding, it becomes committed.

Figure 5:
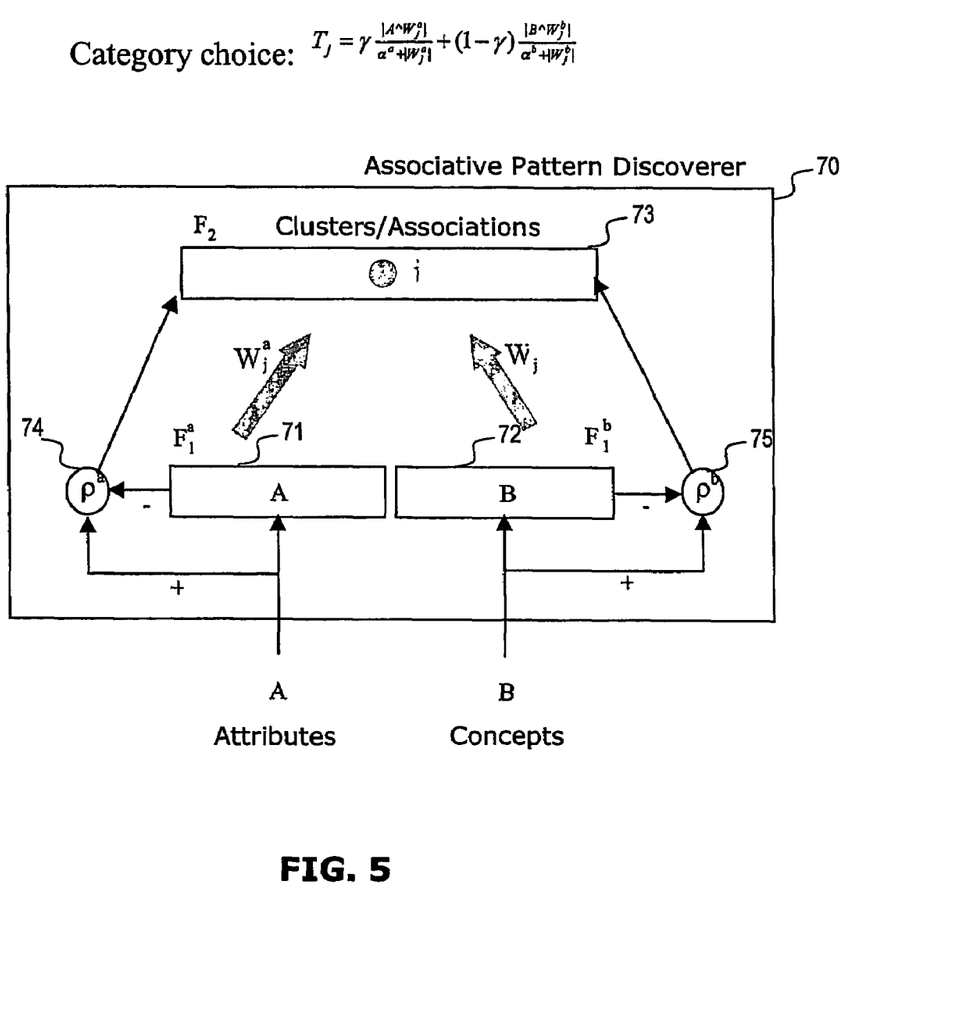
FIG. 5 illustrates a category choice process performed in the associative discoverer of FIG. 4.

With reference to FIG. 5, given an input vector A with an associated input vector B, the system first searches for an $F_2$ cluster J encoding a template vector $w_j^a$ and a template vector $w_j^b$ paired therewith that are closest to the input vectors A and B, respectively, according to a similarity function. Specifically, for each $F_2$ cluster j, the clustering engine calculates a similarity score based on the input vectors A and B, and the template vectors $w_j^a$ and $w_j^b$, respectively. An example of a similarity function is given below as the category choice function, eqn. (2). The $F_2$ cluster that has the maximal similarity score is then selected and indexed at J.

Figure 6:
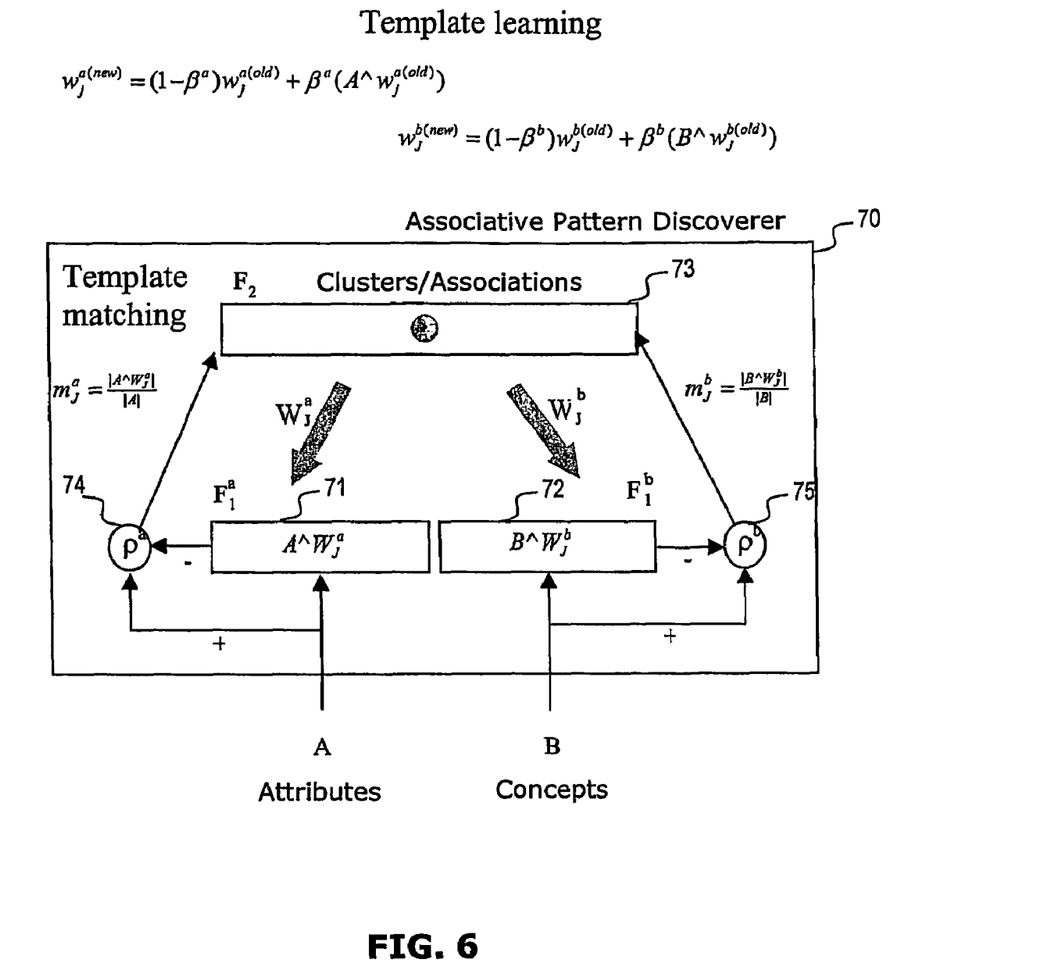
FIG. 6 illustrates a template matching process and a template learning process performed in the associative discoverer of FIG. 4.

With reference to FIG. 6, the system performs template matching to verify that the template vectors $w_j^a$ and $w_j^b$ of the selected cluster J match well with the input information vectors A and B, respectively, according to another similarity function, e.g. eqn. (3) below. If so, the system performs template learning to modify the template vectors $w_j^a$ and $w_j^b$ of the $F_2$ cluster J to encode the input vectors A and B, respectively. Otherwise, the cluster is reset and the system repeats the process until a match is found. The detailed algorithm is given below.

The ART modules used in ARAM may be of a type that categorizes binary patterns, analog patterns, or a combination of the two patterns (referred to as "fuzzy ART"), as is known in the art. Described below is a fuzzy ARAM model composed of two overlapping fuzzy ART modules.

Fuzzy ARAM dynamics are determined by the choice parameters $\alpha^a > 0$ and $\alpha^b > 0$; the learning rates $\beta^a$ in [0,1] and $\beta^b$ in [0,1]; the vigilance parameters $\rho^a$ 74 in [0,1] and $\rho^b$ 75 in [0,1]; and a contribution parameter $\gamma$ in [0,1]. The choice parameters $\alpha^a$ and $\alpha^b$ control the bias towards choosing a $F_2$ cluster whose template vectors have a larger norm or magnitude. The learning rates $\beta^a$ and $\beta^b$ control how fast the template vectors $w_j^a$ and $w_j^b$ adapt to the input vectors A and B, respectively. The vigilance parameters $\rho^a$ and $\rho^b$ determine the criteria for a satisfactory match between the input vectors A and B and the template vectors $w_j^a$ and $w_j^b$, respectively.

The contribution parameter γ controls the weighting of contribution from the $F_1^a$ and $F_1^b$ fields when selecting an $F_2$ cluster.

Figure 7:
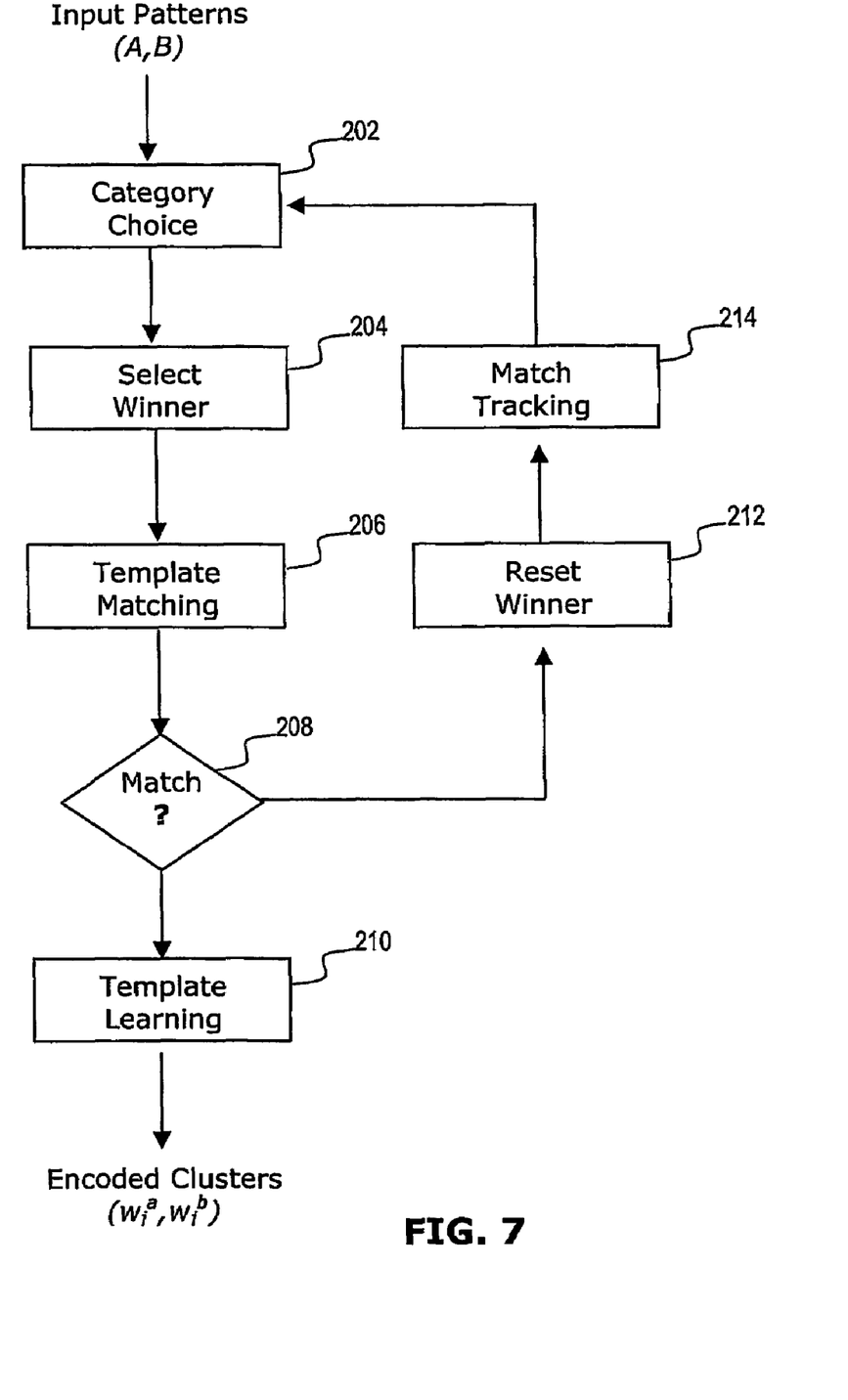
FIG. 7 illustrates an exemplary flow diagram of an associative discovery process of FIG. 2A.

With reference to FIG. 7, the dynamics of the associative discoverer 70 is described by way of a flow diagram. Given a pair of $F_1^a$ and $F_1^b$ input vectors A and B, for each $F_2$ node j, a category choice process 202 computes the choice function $T_j$ as defined by $$T_j = \gamma |A \wedge w_j^a|/(\alpha^a + |w_j^a|) + (1-\gamma)|B \wedge w_j^b|/(\alpha^b + |w_j^b|) \quad (2)$$

where, for vectors p and q, the fuzzy AND operation is defined by $(p \wedge q)_i = \min(p_i, q_i)$, and the norm is defined by $|p| = \Sigma_i p_i$. The system is said to make a choice when at most one $F_2$ node can become active. The choice is indexed at J by a select winner process 204 where $T_J = \max\{T_j:$ for all $F_2$ nodes j$\}$.

A template matching process 206 then checks if the selected cluster represents a good match. Specifically, a check 208 is performed to verify if the match functions, $m_j^a$ and $m_j^b$, meet the vigilance criteria in their respective modules:

$$m_j^a = |A \wedge w_j^a|/|A| \geq \rho^a \text{ and } m_j^b = |B \wedge w_j^b|/|B| \geq \rho^b. \quad (3)$$

Resonance occurs if both criteria are satisfied. Learning then ensues, as defined below. If any of the vigilance constraints is violated, mismatch reset 212 occurs in which the value of the choice function $T_j$ is set to 0 for the duration of the input presentation. The search process repeats, selecting a new index J until resonance is achieved.

Once the search ends, a template learning process 210 updates the template vectors $w_j^a$ and $w_j^b$, respectively, according to the equations:

$$w_j^{a(new)} = (1-\beta^a)w_j^{a(old)} + \beta^a(A \wedge w_j^{a(old)}) \quad (4)$$

and $$w_j^{b(new)} = (1-\beta^b)w_j^{b(old)} + \beta^b(B \wedge w_j^{b(old)}) \quad (5)$$

respectively. For efficient coding of noisy input sets, it is useful to set $\beta^a = \beta^b = 1$ when J is an uncommitted node, and then take $\beta^a < 1$ and $\beta^b < 1$ after the cluster node is committed. Fast learning corresponds to setting $\beta^a = \beta^b = 1$ for committed nodes.

At the start of each input presentation, the vigilance parameter $\rho^a$ equals a baseline vigilance $\underline{\rho}^a$. If a reset occurs in the cluster field $F_2$, a match tracking process 214 increases $\rho^a$ until it is slightly larger than the match function $m_j^a$. The search process then selects another $F_2$ node J under the revised vigilance criterion. An exemplary setting for the other parameters is as follows: $\alpha^a = \alpha^b = 0.1$, $\beta^a = \beta^b = 1$, $\underline{\rho}^a 0.5$, $\rho^b = 1$, and $\gamma = 0.5$.

Through its supervised learning procedure, the associative discoverer 70 learns hidden relationship in terms of mapping between the attribute set $\{a_{i1}, a_{i2}, \ldots, a_{in}\}$ and the concept B. The knowledge uncovered may be in the form of $\{f_{i1}, f_{i2}, \ldots, f_{in}\} \rightarrow B$ where $\{f_{i1}, f_{i2}, \ldots, f_{in}\}$, a subset of $\{a_{i1}, a_{i2}, \ldots, a_{in}\}$, indicates the key features that are related to B.

Knowledge Interpretation

Figure 8:
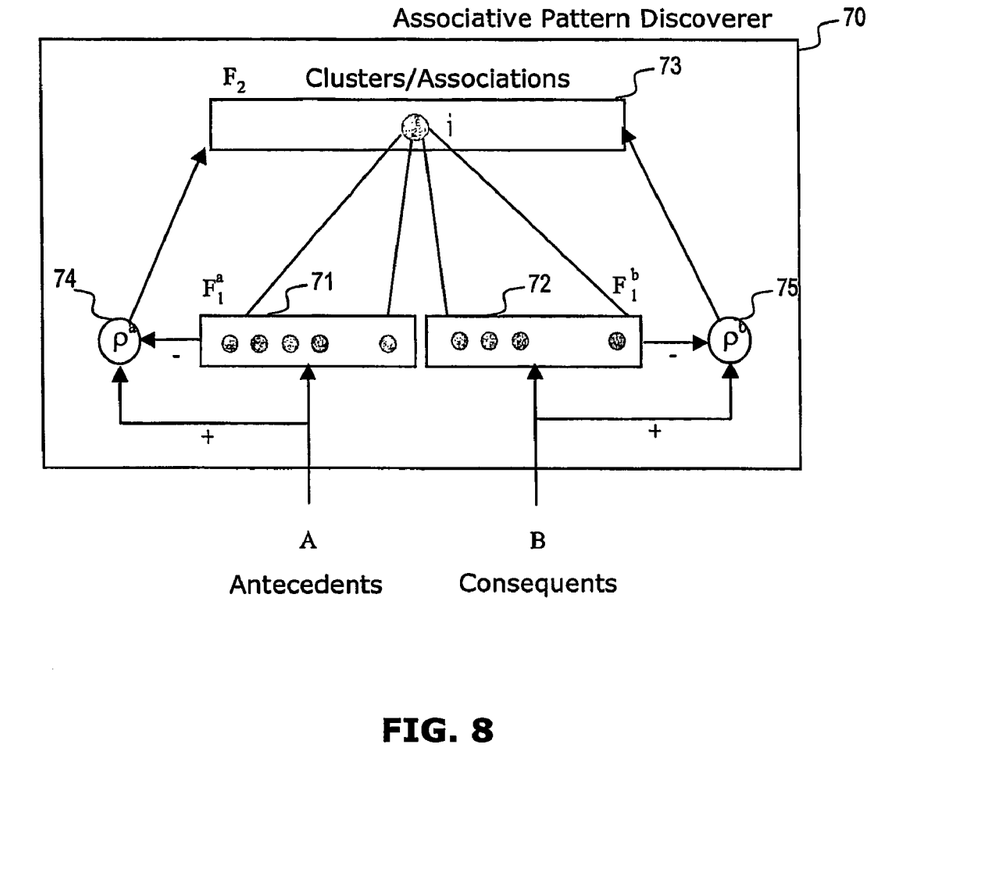
FIG. 8 illustrates a correspondence process between a cluster in the associative discoverer of FIG. 4 and an IF_THEN rule, in which template vectors $w_j^a$ and $w_j^b$ encoded by a cluster j can be interpreted as a rule mapping a set of antecedents represented by $w_j^a$ to consequents represented by $w_j^b$.

As the last step of the knowledge discovery method, the Knowledge Interpretation step 170 extracts symbolic knowledge in the form of IF-THEN rules from an ARAM. There is provided one such rule extraction algorithm as described in "Rule Extraction: From Neural Architecture to Symbolic Representation", published in "Connection Science", Vol. 7, No. 1, pp. 3-26 (1995). Referring to FIG. 8, in a fuzzy ARAM network, each cluster node in the $F_2$ field roughly corresponds to a rule. Each node has an associated weight vector that can be directly translated into a verbal description of the antecedents in the corresponding rule. Each such node is also associated to a weight template vector in the $F_1^b$ field, which in turn encodes a prediction. Learned weight vectors, one for each $F_2$ node, constitute a set of rules that link antecedents to consequences. The number of rules equals the number of $F_2$ nodes that become active during learning.

However, large databases typically cause ARAM to generate too many rules to be of practical use. To reduce the complexity of fuzzy ARAM, a rule pruning procedure aims to select a small set of rules from trained ARAM networks based on their confidence factors. To derive concise rules, an antecedent pruning procedure aims to remove antecedents from rules while preserving accuracy.

Rule Pruning

The rule pruning algorithm derives a confidence factor for each $F_2$ cluster node in terms of its usage frequency in a training set and its predictive accuracy on a predicting set. Usage and accuracy roughly corresponds to support and confidence as used in the field of associative rule mining, respectively. The confidence factor identifies good rules with nodes that are frequently and correctly used. This allows pruning of ARAM to remove rules with low confidence. Overall performance is actually improved when the pruning algorithm removes rules that were created to handle misleading special cases.

Specifically, the pruning algorithm evaluates a $F_2$ cluster j in terms of a confidence factor $C_j$:

$$C_j = \gamma U_j + (1-\gamma)A_j, \quad (6)$$

where $U_j$ is the usage of node j, $A_j$ is its accuracy, and γ in [0,1] is a weighting factor.

For a cluster j that predicts outcome k, its usage $U_j$ equals the fraction of training set patterns with outcome k coded by node j ($F_j$), divided by the maximum fraction of training patterns coded by any node J ($F_J$):

$$U_j = F_j/\max\{F_J\}. \quad (7)$$

For a cluster j that predicts outcome k, its accuracy $A_j$ equals the percent of predicting set patterns predicted correctly by node j ($P_j$), divided by the maximum percent of patterns predicted correctly by any node J ($P_J$) that predicts outcome $_k$:

$$A_j = P_j/\max\{P_J: \text{node J predicts outcome k}\}. \quad (8)$$

After confidence factors are determined, clusters can be pruned from the network using one of following strategies:

Threshold Pruning—This is the simplest type of pruning where the $F_2$ nodes with confidence factors below a given threshold τ are removed from the network. A typical setting for τ is 0.5. This method is fast and provides an initial elimination of unwanted nodes. To avoid over-pruning, it is sometimes useful to specify a minimum number of clusters to be preserved in the system.

Local Pruning—Local pruning removes clusters one at a time from an ARAM network. The baseline system performance on the training and the predicting sets is first determined. Then the algorithm deletes the cluster with the lowest confidence factor. The cluster is replaced, however, if its removal degrades system performance on the training and predicting sets.

A variant of the local pruning strategy updates baseline performance each time a cluster is removed. This option, called hill-climbing, gives slightly larger rule sets but better predictive accuracy. A hybrid strategy first prunes the ARAM systems using threshold pruning and then applies local pruning on the remaining smaller set of rules.

Antecedent Pruning

During rule extraction, a non-zero weight to an $F_2$ cluster node translates into an antecedent in the corresponding rule. The antecedent pruning procedure calculates an error factor for each antecedent in each rule based on its performance on the training and predicting sets. When a rule makes a predictive error, each antecedent of the rule that also appears in the current input has its error factor increased in proportion to the smaller of its magnitudes in the rule and in the input vector. After the error factor for each antecedent is determined, a local pruning strategy, similar to the one for rules, removes redundant antecedents.

Quantizing Weight Values

When learning analog patterns or with slow learning, ARAM learns real-valued weights. In order to describe the rules in words rather than real numbers, the feature values represented by weights $w_j^a$ are quantized. A quantization level Q is defined as the number of feature values used in the extracted fuzzy rules. For example, with Q=3, feature values are described as low, medium, or high in the fuzzy rules. Quantization by truncation divides the range of [0,1] into Q intervals and assigns a quantization point to the lower bound of each interval; i.e., for q=1, ..., Q, let $V_q=(q-1)/Q$. When a weight w falls in interval q, the algorithm reduces the value of w to $V_q$. Quantization by round-off distributes Q quantization points evenly in the range of [0,1], with one at each end point; i.e., for q=1, ..., Q, let Vq=(q-1)/(Q-1). The algorithm then rounds a weight w to the nearest Vq value.

Figure 9:
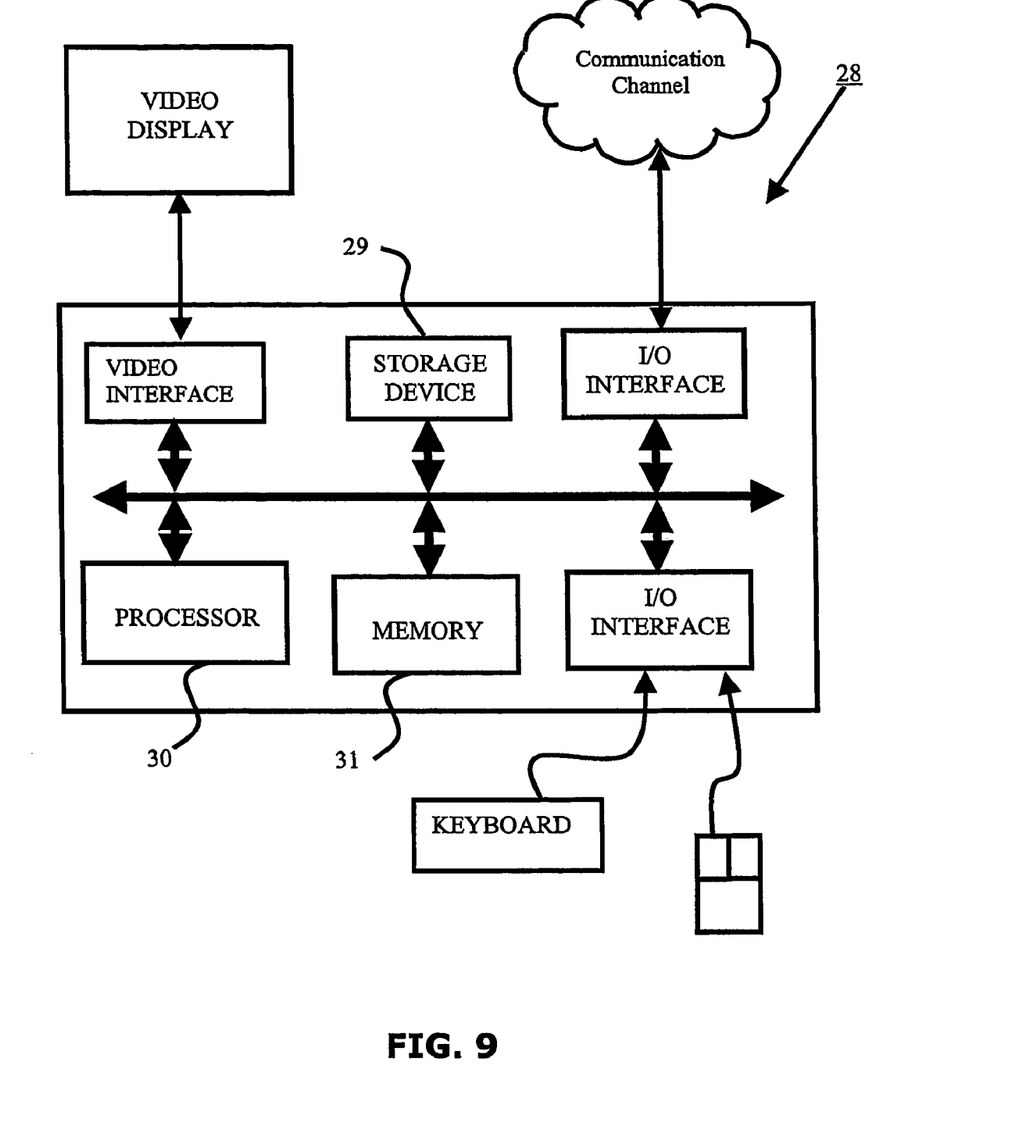
FIG. 9 illustrates a general-purpose computer by which the embodiments of the invention are preferably implemented.

The embodiments of the invention are preferably implemented using a computer, such as the general-purpose computer shown in FIG. 9, or group of computers that are interconnected via a network. In particular, the functionality or processing of the knowledge discovery system and method of FIGS. 1 to 8 may be implemented as software, or a computer program, executing on the computer or group of computers. The method or process steps for acquiring, sharing and managing knowledge and information within an organization are effected by instructions in the software that are carried out by the computer or group of computers. The software may be implemented as one or more modules for implementing the process steps. A module is a part of a computer program that usually performs a particular function or related functions. Also, a module can also be a packaged functional hardware unit for use with other components or modules.

In particular, the software may be stored in a computer readable medium, including the storage devices described below. The software is preferably loaded into the computer or group of computers from the computer readable medium and then carried out by the computer or group of computers. A computer program product includes a computer readable medium having such software or a computer program recorded on it that can be carried out by a computer. The use of the computer program product in the computer or group of computers preferably effects an advantageous system for acquiring, sharing and managing knowledge and information within an organization in accordance with the embodiments of the invention.

The system 28 is simply provided for illustrative purposes and other configurations can be employed without departing from the scope and spirit of the invention. Computers with which the embodiment can be practiced include IBM-PC/ATs or compatibles, one of the Macintosh™ family of PCs, Sun Sparcstation™, a workstation or the like. The foregoing is merely exemplary of the types of computers with which the embodiments of the invention may be practiced. Typically, the processes of the embodiments, described hereinafter, are resident as software or a program recorded on a hard disk drive (generally depicted as block 29 in FIG. 16) as the computer readable medium, and read and controlled using the processor 30. Intermediate storage of the program and any data may be accomplished using the semiconductor memory 31, possibly in concert with the hard disk drive 29.

In some instances, the program may be supplied to the user encoded on a CD-ROM or a floppy disk (both generally depicted by block 29), or alternatively could be read by the user from the network via a modem device connected to the computer, for example. Still further, the software can also be loaded into the computer system 28 from other computer readable medium including magnetic tape, a ROM or integrated circuit, a magneto-optical disk, a radio or infra-red transmission channel between a computer and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

In the foregoing manner, a system and a method for transforming meta-data or information extracted from text documents and thereby discovering knowledge that is new or previously not mentioned in the extracted information and the original documents are described. Although only a number of embodiments of the invention are disclosed, it will be apparent to one skilled in the art in view of this disclosure that numerous changes and/or modification can be made without departing from the scope and spirit of the invention.

The invention claimed is:

1. A method for discovering knowledge from a set of text documents using a processor, the method comprising:
    extracting semi-structured meta-data from the set of text documents using a meta-data extractor, the semi-structured meta-data comprising a plurality of concepts and a plurality of relations between the concepts;
    filtering the semi-structured meta-data to identify a set of key concepts and a corresponding set of key relations between the key concepts, the set of key concepts corresponding to the plurality of concepts;
    deriving at least one set of sub-concepts corresponding to the set of key concepts based upon data within a domain knowledge base, using a meta-data transformer;
    formulating a plurality of training samples, each training sample including a vector representing a sub-concept and a vector representing a key concept; and
    analyzing the plurality of training samples using an associative discoverer to derive a set of associations between a set of vectors representing a sub-concept and at least one vector representing a key concept,
    wherein neither the set of text documents nor the semi-structured meta-data mention the set of associations, and
    wherein the set of associations corresponds to discovered knowledge that is extractable by a knowledge interpreter.

2. The method as in claim 1, wherein extracting semi-structured meta-data from the set of text documents comprises extracting text content from documents containing at least one type of text, image, audio, and video information.

3. The method as in claim 1, wherein filtering the semi-structured meta-data comprises selecting the set of key concepts according to frequency of appearance of the set of key concepts in the semi-structured meta-data.

4. The method as in claim 1, wherein identifying the set of key relations comprises selecting the set of key relations according to frequency of appearance of the set of key relations in the semi-structured meta-data.

5. The method as in claim 1, wherein data within the domain knowledge base relate to at least one of taxonomy, a concept hierarchy network, ontology, a thesaurus, a relational database, and an object-oriented database.

6. The method as in claim 1, wherein formulating the plurality of training samples comprises formulating concatenated vector representations of the set of sub-concepts and the set of key concepts relating to the corresponding set of key relations.

7. The method as in claim 1, wherein analyzing the plurality of training samples using the associative discoverer comprises the step of analyzing the plurality of training samples using at least one of a neural network, a statistical system, and a symbolic machine learning system.

8. The method as in claim 7, wherein analyzing the plurality of training samples comprises the step of analyzing the plurality of training samples using an Adaptive Resonance Associative Map.

9. The method as in claim 1, wherein extraction of discovered knowledge by the knowledge interpreter comprises discovering the semantic relations between the set of sub-concepts and the set of key concepts.

10. The method as in claim 1, further comprising the step of using a user interface for displaying the semi-structured meta-data, the set of key concepts, the set of key relations, the set of sub-concepts, and the knowledge discovered.

11. The method as in claim 1, further comprising the step of using a user interface for obtaining user instruction for the set of key concepts and the set of key relations.

12. A computer program product comprising a computer usable medium having computer readable program code means embodied in the medium for discovering knowledge from a set of text documents, the computer program product comprising:
computer readable program code means for extracting semi-structured meta-data from the set of text documents using a meta-data extractor, the semi-structured meta-data comprising a plurality of concepts and a plurality of relations between the concepts;
computer readable program code means for filtering the semi-structured meta-data to identify a set of key concepts and a corresponding set of key relations between the key concepts, the set of key concepts corresponding to the plurality of concepts;
computer readable program code means for deriving at least one set of sub-concepts corresponding to the set of key concepts based upon data within a domain knowledge base, using a meta-data transformer;
computer readable program code means for formulating a plurality of training samples, each training sample including a vector representing a sub-concept and a vector representing a key concept; and
computer readable program code means for analyzing the plurality of training samples using an associative discoverer to derive a set of associations between a set of vectors representing a sub-concept and at least one vector representing a key concept,
wherein neither the set of text documents nor the semi-structured meta-data mention the set of associations, and
wherein the set of associations corresponds to discovered knowledge that is extractable by a knowledge interpreter.

13. The computer program product as in claim 12, wherein the computer readable program code means for extracting semi-structured meta-data from the set of text documents comprises computer readable program code means for extracting text content from documents containing at least one of text, image, audio, and video information.

14. The computer program product as in claim 12, wherein the computer readable program code means for filtering the semi-structured meta-data comprises computer readable program code means for selecting the set of key concepts according to frequency of appearance of the set of key concepts in the semi-structured meta-data.

15. The computer program product as in claim 12, wherein the computer readable program code means for identifying the set of key relations comprises computer readable program code means for selecting the set of key relations according to frequency of appearance of the set of key relations in the semi-structured meta-data.

16. The computer program product as in claim 12, wherein the data within the domain knowledge base relate to at least one of taxonomy, a concept hierarchy network, ontology, a thesaurus, a relational database, and an object-oriented database.

17. The computer program product as in claim 12, wherein the computer readable program code means for formulating the plurality of training samples comprises computer readable program code means for formulating concatenated vector representations of the set of sub-concepts and the set of key concepts relating to the corresponding set of key relations.

18. The computer program product as in claim 12, wherein the computer readable program code means for analyzing the plurality of training samples using the associative discoverer comprises computer readable program code means for analyzing the plurality of training samples using at least one of a neural network, a statistical system, and a symbolic machine learning system.

19. The computer program product as in claim 18, wherein the computer readable program code means for analyzing the plurality of training samples comprises computer readable program code means for analyzing the plurality of training samples using an Adaptive Resonance Associative Map.

20. The computer program product as in claim 12, wherein extraction of discovered knowledge by the knowledge interpreter comprises discovering the semantic relations between the set of sub-concepts and the set of key concepts.

21. The computer program product as in claim 12, further comprising computer readable program code means for using a user interface for displaying the semi-structured meta-data, the set of key concepts, the set of key relations, the set of sub-concepts, and the knowledge discovered.

22. The computer program product as in claim 12, further comprising computer readable program code means for using a user interface for obtaining user instruction for the set of key concepts and the set of key relations.

23. A system for knowledge discovery from a set of free-text documents, the system comprising:
means for extracting semi-structured meta-data from the set of free-text documents;
means for filtering the semi-structured meta-data to identify a set of key concepts and a corresponding set of key relations between the key concepts, the set of key concepts corresponding to the plurality of concepts;
means for deriving at least one set of sub-concepts corresponding to the set of key concepts based upon data within a domain knowledge base, means for formulating training samples, each training sample including a vector representing a sub-concept and a vector representing a key concept; and means for deriving a set of associations between a set of vectors representing a sub-concept and at least one vector representing a key concept, wherein neither the set of text documents nor the semi-structured meta-data mention the set of associations, and wherein the set of associations corresponds to discovered knowledge that is extractable by a knowledge interpreter.

24. The system according to claim 23 wherein the semi-structured meta-data comprises definition of concepts and semantic relations among the concepts.

25. The system according to claim 23 wherein the semi-structured meta-data is stored in at least one of a permanent and temporary storage.

26. The system according to claim 23 wherein the set of free-text documents comprise text, image, audio, video, or any combination thereof.

27. The system according to claim 23 wherein the means for filtering the semi-structured meta-data comprises means for selecting the set of key concepts according to frequency of appearance of the set of key concepts in the semi-structured meta-data.

28. The system according to claim 23 wherein the means for identifying the set of key relations comprises means for selecting the set of key relations according to frequency of appearance of the set of key relations in the semi-structured meta-data.

29. The system according to claim 23 wherein the domain knowledge base comprises a taxonomy, a concept hierarchy network, an ontology, a thesaurus, a relational database, an object-oriented database, or any combination thereof.

30. The system according to claim 23 wherein the training samples comprises concatenated vector representations of the set of sub-concepts and the set of key concepts relating to the corresponding set of key relations.

31. The system according to claim 23 wherein the means for deriving the set of associations comprises a neural network, a statistical system, a symbolic machine learning system, or any combination thereof.

32. The system according to claim 23 wherein the means for deriving the set of associations comprises an Adaptive Resonance Associative Map for analyzing the plurality of training samples.

33. The system according to claim 23 wherein the discovered knowledge comprises implicit hidden key relations between the sub-concepts and the key concepts.

34. The system according to claim 23 wherein the system further comprises a user interface for displaying the semi-structured meta-data, the key concepts, the key relations, the sub-concepts, and the knowledge discovered.

35. The system according to claim 23 wherein the knowledge discovery system further comprises a user interface for obtaining user's instruction for the key concepts and the key relations.

36. The method of claim 1 wherein filtering the semi-structured meta-data includes automatically performing a statistical analysis upon the semi-structured meta-data.

37. The method of claim 1 wherein the domain knowledge base is dependent upon one of a taxonomy, an ontology, a database, and a concept hierarchy network.

38. The method of claim 1 wherein analyzing the plurality of training samples comprises mapping a plurality of sub-concepts to a key concept.

39. The method of claim 1 further comprising deriving a set of IF-THEN rules corresponding to the set of associations, the set of IF-THEN rules corresponding to new symbolic knowledge.

* * * * *